United States Patent
Dabbiere

(10) Patent No.: US 9,514,078 B2
(45) Date of Patent: Dec. 6, 2016

(54) PERIPHERAL DEVICE MANAGEMENT

(71) Applicant: AirWatch LLC, Atlanta, GA (US)

(72) Inventor: David Dabbiere, Atlanta, GA (US)

(73) Assignee: AirWatch LLC, Palo Alto, CA (US)

( * ) Notice: Subject to any disclaimer, the term of this patent is extended or adjusted under 35 U.S.C. 154(b) by 0 days.

(21) Appl. No.: 14/582,386

(22) Filed: Dec. 24, 2014

(65) Prior Publication Data

US 2015/0169485 A1 Jun. 18, 2015

Related U.S. Application Data

(63) Continuation of application No. 13/925,943, filed on Jun. 25, 2013, now Pat. No. 8,924,608.

(51) Int. Cl.
*G06F 13/38* (2006.01)
*G06F 13/14* (2006.01)

(52) U.S. Cl.
CPC .............. *G06F 13/385* (2013.01); *G06F 13/14* (2013.01)

(58) Field of Classification Search
CPC ........... H04L 43/0817; H04L 12/2602; H04L 43/00; G06F 13/385; G06F 9/4411; G06F 13/14; G06F 13/20; G06F 13/36
See application file for complete search history.

(56) References Cited

U.S. PATENT DOCUMENTS

| | | | |
|---|---|---|---|
| 4,325,120 A | 4/1982 | Colley et al. | |
| 6,023,708 A | 2/2000 | Mendez et al. | |
| 6,085,192 A | 7/2000 | Mendez et al. | |
| 6,131,096 A | 10/2000 | Ng et al. | |
| 6,131,116 A | 10/2000 | Riggins et al. | |
| 6,151,606 A | 11/2000 | Mendez | |
| 6,233,341 B1 | 5/2001 | Riggins | |
| 6,560,772 B1 | 5/2003 | Slinger | |
| 6,708,221 B1 | 3/2004 | Mendez et al. | |
| 6,714,859 B2 | 3/2004 | Jones | |
| 6,726,106 B1 | 4/2004 | Han et al. | |
| 6,727,856 B1 | 4/2004 | Hill | |
| 6,741,232 B1 | 5/2004 | Siedlikowski et al. | |
| 6,741,927 B2 | 5/2004 | Jones | |
| 6,766,454 B1 | 7/2004 | Riggins | |
| 6,779,118 B1 | 8/2004 | Ikudome et al. | |
| 6,904,359 B2 | 6/2005 | Jones | |
| 6,965,876 B2 | 11/2005 | Dabbiere | |
| 6,995,749 B2 | 2/2006 | Friend | |
| 7,032,181 B1 | 4/2006 | Farcasiu | |
| 7,039,394 B2 | 5/2006 | Bhaskaran | |
| 7,039,679 B2 | 5/2006 | Mendez et al. | |
| 7,064,688 B2 | 6/2006 | Collins et al. | |

(Continued)

OTHER PUBLICATIONS

Office Action mailed May 20, 2015, for Application No. 14/582,386.

(Continued)

*Primary Examiner* — Farley Abad

(57) ABSTRACT

A method, system, apparatus, and computer program product are provided for providing peripheral device management. For example, a method is provided that includes receiving, from a user device, a request to access at least one peripheral device, the request comprising information regarding the user device. The method may further include determining, based at least in part on at least one compliance rule and the information regarding the user device, whether to grant the request, and, in an instance in which it is determined to grant the request, causing access to the at least one peripheral device by the user device to be facilitated.

20 Claims, 5 Drawing Sheets

(56) References Cited

U.S. PATENT DOCUMENTS

| | | |
|---|---|---|
| 7,092,943 B2 | 8/2006 | Roese et al. |
| 7,131,132 B1* | 10/2006 | Gehlot et al. ............... 725/10 |
| 7,149,529 B2* | 12/2006 | Parry ..................... 455/456.1 |
| 7,184,801 B2 | 2/2007 | Farcasiu |
| 7,191,058 B2 | 3/2007 | Laird et al. |
| 7,203,959 B2 | 4/2007 | Nachenberg et al. |
| 7,225,231 B2 | 5/2007 | Mendez et al. |
| 7,228,383 B2 | 6/2007 | Friedman et al. |
| 7,275,073 B2 | 9/2007 | Ganji et al. |
| 7,284,045 B1 | 10/2007 | Marl et al. |
| 7,287,271 B1 | 10/2007 | Riggins |
| 7,308,703 B2 | 12/2007 | Wright et al. |
| 7,310,535 B1 | 12/2007 | MacKenzie et al. |
| 7,353,533 B2 | 4/2008 | Wright et al. |
| 7,363,349 B2 | 4/2008 | Friedman et al. |
| 7,363,361 B2 | 4/2008 | Tewari et al. |
| 7,372,517 B2 | 5/2008 | Saitoh et al. |
| 7,437,752 B2 | 10/2008 | Heard et al. |
| 7,444,375 B2 | 10/2008 | McConnell et al. |
| 7,447,506 B1 | 11/2008 | MacKenzie et al. |
| 7,447,799 B2 | 11/2008 | Kushner |
| 7,475,152 B2 | 1/2009 | Chan et al. |
| 7,539,665 B2 | 5/2009 | Mendez |
| 7,565,314 B2 | 7/2009 | Borgeson et al. |
| 7,590,403 B1 | 9/2009 | House et al. |
| 7,594,224 B2 | 9/2009 | Patrick et al. |
| 7,603,547 B2 | 10/2009 | Patrick et al. |
| 7,603,548 B2 | 10/2009 | Patrick et al. |
| 7,603,703 B2 | 10/2009 | Craft et al. |
| 7,617,222 B2 | 11/2009 | Coulthard et al. |
| 7,620,001 B2 | 11/2009 | Ganji |
| 7,620,392 B1 | 11/2009 | Maurya et al. |
| 7,650,491 B2 | 1/2010 | Craft et al. |
| 7,660,902 B2 | 2/2010 | Graham et al. |
| 7,665,118 B2 | 2/2010 | Mann et al. |
| 7,665,125 B2 | 2/2010 | Heard et al. |
| 7,685,645 B2 | 3/2010 | Doyle et al. |
| 7,702,322 B1 | 4/2010 | Maurya et al. |
| 7,702,785 B2 | 4/2010 | Bruton, III et al. |
| 7,735,112 B2 | 6/2010 | Kim et al. |
| 7,735,122 B1 | 6/2010 | Johnson et al. |
| 7,739,334 B1 | 6/2010 | Ng et al. |
| 7,752,166 B2 | 7/2010 | Quinlan et al. |
| 7,788,382 B1 | 8/2010 | Jones et al. |
| 7,792,297 B1 | 9/2010 | Piccionelli et al. |
| 7,840,631 B2 | 11/2010 | Farcasiu |
| 7,890,091 B2 | 2/2011 | Puskoor et al. |
| 7,912,896 B2 | 3/2011 | Wolovitz et al. |
| 7,917,641 B2 | 3/2011 | Crampton |
| 7,970,386 B2 | 6/2011 | Bhat et al. |
| 8,001,082 B1 | 8/2011 | Muratov |
| 8,012,219 B2 | 9/2011 | Mendez et al. |
| 8,041,776 B2 | 10/2011 | Friedman et al. |
| 8,046,823 B1 | 10/2011 | Begen et al. |
| 8,060,074 B2 | 11/2011 | Danford et al. |
| 8,069,144 B2 | 11/2011 | Quinlan et al. |
| 8,078,157 B2 | 12/2011 | Maurya et al. |
| 8,094,591 B1 | 1/2012 | Hunter et al. |
| 8,117,344 B2 | 2/2012 | Mendez et al. |
| 8,150,431 B2 | 4/2012 | Wolovitz et al. |
| 8,447,829 B1* | 5/2013 | Geller et al. ............... 709/217 |
| 8,694,654 B1* | 4/2014 | Kalusivalingam et al. .. 709/228 |
| 2002/0013721 A1 | 1/2002 | Dabbiere et al. |
| 2002/0184304 A1* | 12/2002 | Meade, II et al. ............ 709/203 |
| 2003/0110084 A1 | 6/2003 | Eberhard et al. |
| 2003/0204716 A1 | 10/2003 | Rockwood et al. |
| 2004/0098604 A1 | 5/2004 | Noldge |
| 2004/0123153 A1 | 6/2004 | Wright et al. |
| 2004/0181687 A1 | 9/2004 | Nachenberg et al. |
| 2004/0203350 A1* | 10/2004 | Shultz et al. ................ 455/41.1 |
| 2004/0224703 A1 | 11/2004 | Takaki et al. |
| 2004/0268145 A1* | 12/2004 | Watkins et al. ............... 713/201 |
| 2005/0114226 A1* | 5/2005 | Tripp et al. ..................... 705/26 |
| 2005/0246192 A1 | 11/2005 | Jauffred et al. |
| 2006/0095369 A1* | 5/2006 | Hofi ....................... G06Q 20/10 705/39 |
| 2006/0190411 A1* | 8/2006 | Gava et al. ............. G06Q 10/10 705/64 |
| 2006/0190984 A1 | 8/2006 | Heard et al. |
| 2007/0033397 A1 | 2/2007 | Phillips Ii et al. |
| 2007/0103712 A1* | 5/2007 | Corona ................. G06F 21/335 358/1.14 |
| 2007/0136492 A1 | 6/2007 | Blum et al. |
| 2007/0156897 A1 | 7/2007 | Lim |
| 2007/0174433 A1 | 7/2007 | Mendez et al. |
| 2007/0288637 A1 | 12/2007 | Layton et al. |
| 2008/0071935 A1* | 3/2008 | Ohta ............................... 710/10 |
| 2008/0133712 A1 | 6/2008 | Friedman et al. |
| 2008/0134305 A1 | 6/2008 | Hinton et al. |
| 2008/0201453 A1 | 8/2008 | Assenmacher |
| 2008/0231899 A1 | 9/2008 | Morimoto |
| 2009/0036111 A1 | 2/2009 | Danford et al. |
| 2009/0144632 A1 | 6/2009 | Mendez |
| 2009/0160064 A1 | 6/2009 | Jeong |
| 2009/0198997 A1 | 8/2009 | Yeap et al. |
| 2009/0216921 A1 | 8/2009 | Saito et al. |
| 2009/0300739 A1 | 12/2009 | Nice et al. |
| 2009/0307362 A1 | 12/2009 | Mendez et al. |
| 2010/0005125 A1 | 1/2010 | Mendez et al. |
| 2010/0005157 A1 | 1/2010 | Mendez et al. |
| 2010/0005195 A1 | 1/2010 | Mendez et al. |
| 2010/0023630 A1 | 1/2010 | Mendez et al. |
| 2010/0100641 A1 | 4/2010 | Quinlan et al. |
| 2010/0120450 A1 | 5/2010 | Herz |
| 2010/0144323 A1 | 6/2010 | Collins et al. |
| 2010/0146269 A1 | 6/2010 | Baskaran |
| 2010/0254410 A1 | 10/2010 | Collins |
| 2010/0268844 A1 | 10/2010 | Quinlan et al. |
| 2010/0273456 A1 | 10/2010 | Wolovitz et al. |
| 2010/0299152 A1 | 11/2010 | Batchu et al. |
| 2010/0299362 A1 | 11/2010 | Osmond |
| 2010/0299376 A1 | 11/2010 | Batchu et al. |
| 2010/0299719 A1 | 11/2010 | Burks et al. |
| 2011/0004941 A1 | 1/2011 | Mendez et al. |
| 2011/0082900 A1 | 4/2011 | Nagpal et al. |
| 2011/0113062 A1 | 5/2011 | Quinlan et al. |
| 2011/0145932 A1 | 6/2011 | Nerger et al. |
| 2011/0153779 A1 | 6/2011 | Mendez et al. |
| 2011/0153799 A1 | 6/2011 | Ito |
| 2011/0167474 A1 | 7/2011 | Sinha et al. |
| 2011/0202589 A1 | 8/2011 | Piernot et al. |
| 2011/0225252 A1 | 9/2011 | Bhat et al. |
| 2011/0270799 A1 | 11/2011 | Muratov |
| 2011/0276805 A1 | 11/2011 | Nagpal et al. |
| 2011/0296186 A1 | 12/2011 | Wong et al. |
| 2011/0320552 A1 | 12/2011 | Friedman et al. |
| 2012/0005578 A1 | 1/2012 | Hawkins |
| 2012/0015644 A1 | 1/2012 | Danford et al. |
| 2012/0102392 A1 | 4/2012 | Reesman et al. |
| 2012/0198547 A1 | 8/2012 | Fredette et al. |
| 2012/0239830 A1 | 9/2012 | Sugimura et al. |
| 2012/0303827 A1* | 11/2012 | Neystadt et al. ............. 709/229 |
| 2013/0152169 A1 | 6/2013 | Stuntebeck |
| 2016/0070666 A1 | 3/2016 | Roberston et al. |

OTHER PUBLICATIONS

Office Action mailed Apr. 28, 2016 for Application No: 13/943,506.

* cited by examiner

PERIPHERAL DEVICE MANAGEMENT

CROSS-REFERENCE TO RELATED APPLICATIONS

This application is a continuation of and claims the benefit of U.S. patent application Ser. No. 13/925,943, entitled "PERIPHERAL DEVICE MANAGEMENT," and filed Jun. 25, 2013, which is hereby incorporated by reference in its entirety.

FIELD OF APPLICATION

Embodiments of the present invention relate generally to device management and, more particularly, to systems, methods, apparatuses, and computer program products for facilitating peripheral device management.

BACKGROUND

Peripheral devices are electronic devices that are accessible to and/or controllable by, but are not an essential component of, one or more host computing devices. Peripheral devices are frequently, but not necessarily, external to such host devices. Common examples of peripherals include printers, scanners, mice, keyboards, external hard drives, sensors, cameras, speakers, or the like.

The number and complexity of peripheral devices being used, especially in enterprise environments, is constantly increasing, with many modern peripheral devices incorporating sophisticated processing capabilities to facilitate access, maintenance, diagnostics, control, or the like. For example, complex devices such as vehicles, home/office automation systems, or entire cloud computing systems may be considered peripheral devices. Current options for managing these complex collections of peripheral devices are limited.

SUMMARY

This Summary is provided to introduce a selection of concepts in a simplified form that are further described below in the Detailed Description. This Summary is not intended to identify key features or essential features of the claimed subject matter. Neither is this Summary intended to be used to limit the claimed subject matter's scope.

According to one example embodiment, a method is provided that includes receiving, from a user device, a request to access at least one peripheral device, the request comprising information regarding the user device. The method further includes determining whether to grant the request based at least in part on at least one compliance rule and the information regarding the user device, and, in an instance in which it is determined to grant the request, causing access to the at least one peripheral device by the user device to be facilitated.

According to another example embodiment, an apparatus is provided that includes at least one processor and at least one memory storing program code instructions. The at least one memory and program code instructions of the example embodiment are configured to, with the at least one processor, direct the apparatus to at least receive, from a user device, a request to access at least one peripheral device, the request comprising information regarding the user device. The apparatus is further directed to determine, based at least in part on at least one compliance rule and the information regarding the user device, whether to grant the request, and, in an instance in which it is determined to grant the request, cause access to the at least one peripheral device by the user device to be facilitated.

According to yet another example embodiment, a computer program product is provided, the computer program product including a computer-readable storage medium having program code portions embodied therein. The program code portions of the example embodiment are configured to, upon execution, direct an apparatus to at least receive, from a user device, a request to access at least one peripheral device, the request comprising information regarding the user device. The apparatus is further directed to determine, based at least in part on at least one compliance rule and the information regarding the user device, whether to grant the request, and, in an instance in which it is determined to grant the request, cause access to the at least one peripheral device by the user device to be facilitated.

According to another example embodiment, an apparatus is provided that includes means for receiving, from a user device, a request to access at least one peripheral device, the request comprising information regarding the user device. The apparatus further includes means for determining, based at least in part on at least one compliance rule and the information regarding the user device, whether to grant the request, and means for causing access to the at least one peripheral device by the user device to be facilitated in an instance in which it is determined to grant the request.

It is to be understood that both the foregoing general description and the following detailed description are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the detailed description.

BRIEF DESCRIPTION OF THE DRAWINGS

Many aspects of the present disclosure can be better understood with reference to the following diagrams. The drawings are not necessarily to scale. Instead, emphasis is placed upon clearly illustrating certain features of the disclosure. Moreover, in the drawings, like reference numerals designate corresponding parts throughout the several views. In the drawings.

DETAILED DESCRIPTION

Figure 1:
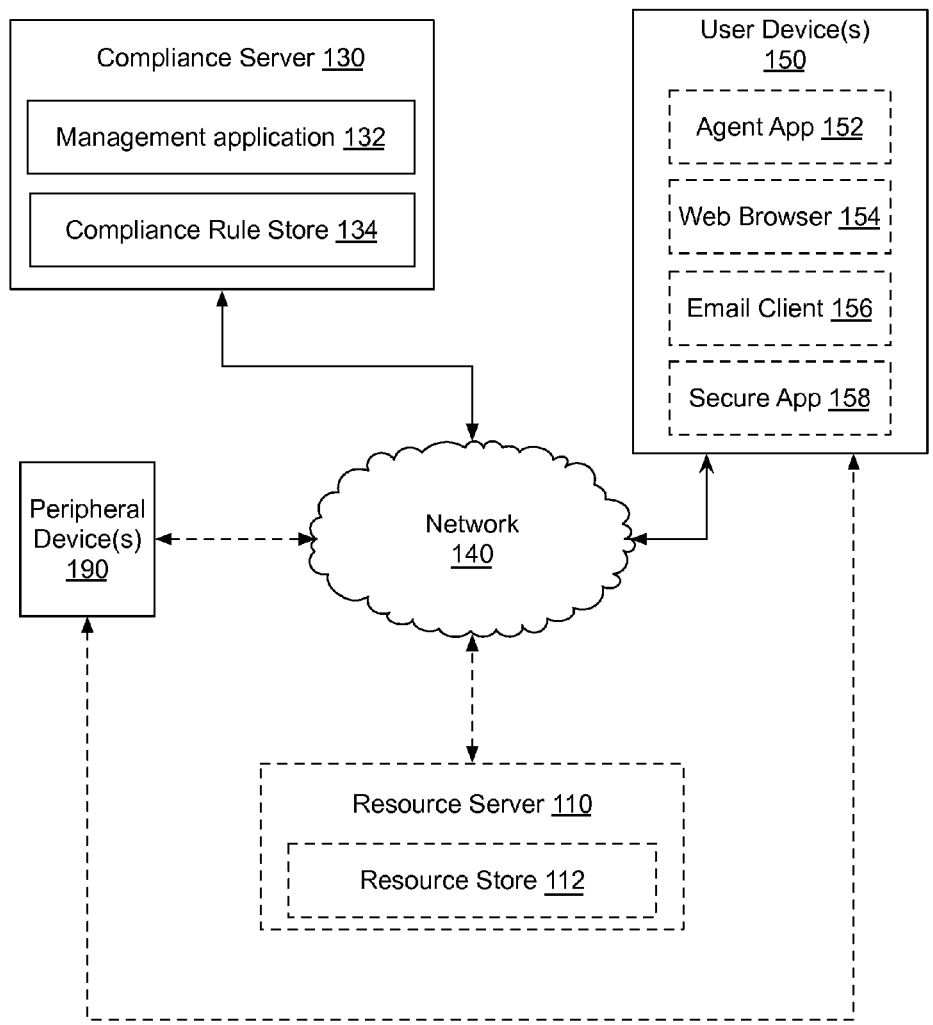
FIG. 1 is a schematic representation of an example system which may be configured according to example embodiments of the present invention.

The present invention now will be described more fully hereinafter with reference to the accompanying drawings, in which some, but not all embodiments of the inventions are shown. Wherever possible, the same reference numbers are used in the drawings and the following description to refer to the same or similar elements. While embodiments of the disclosure may be described, modifications, adaptations, and other implementations are possible. For example, substitutions, additions, subtractions and/or modifications may be made to the elements illustrated in the drawings, as indicated in some cases via dashed lines, and the methods described herein may be modified by substituting, reordering, or adding stages to the disclosed methods. Indeed, the present invention may be embodied in many different forms and should not be construed as limited to the embodiments set forth herein; rather, these embodiments are provided so that this disclosure will satisfy applicable legal requirements. Accordingly, the following detailed description does not limit the disclosure. Instead, the proper scope of the disclosure is defined by the appended claims.

As used herein, the terms "data," "content," "information," and similar terms may be used interchangeably to refer to data capable of being transmitted, received, processed and/or stored in accordance with embodiments of the present invention. Thus, use of any such terms should not be taken to limit the spirit and scope of embodiments of the present invention.

Additionally, as the term will be used herein, "circuitry" may refer to hardware-only circuit implementations (e.g., implementations in analog circuitry and/or digital circuitry); combinations of circuits and computer program product(s) including software and/or firmware instructions stored on one or more computer readable memories that work together to cause an apparatus to perform one or more functions described herein; and circuits, such as, for example, one or more microprocessors or portions of a microprocessors, that require software or firmware for operation even if the software or firmware is not physically present. This definition of "circuitry" is applicable to all uses of this term, including in any claims. As another example, the term "circuitry" also includes implementations comprising one or more processors and/or portion(s) thereof and accompanying software and/or firmware. As another example, the term "circuitry" also includes, for example, an integrated circuit or applications processor integrated circuit for a portable communication device or a similar integrated circuit in a server, a network device, and/or other computing device.

As defined herein, a "computer-readable storage medium" refers to a nontransitory physical storage medium (e.g., volatile or non-volatile memory device), and can be differentiated from a "computer-readable transmission medium," which refers to an electromagnetic signal.

The present application is generally directed to device management and, more particularly, to systems, methods, apparatuses, and computer program products for facilitating peripheral device management. Example embodiments of such peripheral device management systems, methods, apparatuses, and computer program products may be configured to provide comprehensive peripheral device management capabilities. For example, embodiments may be configured to control access to peripheral devices, such as by user devices, via the application of one or more (e.g., at least one) compliance rules. These compliance rules may, for example, restrict and/or allow access based on any number of conditions, such as a user device's location, a user or user device's security credentials, one or more temporal conditions, or any number of other conditions.

Other example embodiments may additionally or alternatively facilitate access to peripheral devices by user devices, such as by facilitating and/or causing the installation of supporting software such as drivers on appropriate user devices. Some embodiments may, for example, facilitate and/or cause such installations to occur in advance, e.g., prior to the user device's requesting access to a peripheral device, while others may, for example, facilitate and/or cause such installations to occur on site, e.g., following the user device's requesting access to a peripheral device.

Other example embodiments may additionally or alternatively be configured to facilitate various peripheral device lifecycle management functions. For example, some embodiments may facilitate peripheral device maintenance and/or support, such as by causing maintenance, support, and/or procurement requests to be generated. Such requests may, for example, be generated based at least in part on operational status information, sensor data, or the like, which may be received, for example, directly from peripheral devices and/or from user devices attempting to access such peripheral devices. Other example embodiments may additionally or alternatively provide various optimization functions. For example, embodiments may collect information regarding peripheral device usage and generate one or more optimization schemes. Such optimization schemes may, for example, include optimizations related to the procurement, placement, and/or disposal of peripheral devices.

FIG. 1 illustrates a block diagram of an example peripheral device management system. While FIG. 1 illustrates one example configuration of such a peripheral device management system, numerous other configurations may be used according to example embodiments of the present invention. With reference to FIG. 1, however, the peripheral device management system may include at least one user device 150, at least one peripheral device 190, and at least one compliance server 130. A resource server 110 and/or other network elements may additionally be provided according to some example embodiments.

The user device(s) 150 may comprise any device configured to communicate over one or more networks, such as the network 140 depicted in FIG. 1. For example, the user device(s) 150 may comprise a mobile telephone, smartphone, tablet computer, PDA, pager, desktop or laptop computer, a set-top box, a music player, a game console, or any of numerous other fixed or portable communication devices, computation devices, content generation devices, content consumption devices, or combinations thereof.

The peripheral device(s) 190 may comprise any electronic devices that are accessible to and/or controllable by, but are not an essential component of, at least one host electronic device(s), such as the user device(s) 150. For example, the peripheral device(s) 190 may comprise a printer, scanner, mouse, keyboard, external hard drive, sensor, camera, speaker system, vehicle, home/office automation system, cloud computing system, security system, payment processing/point-of-sale system or any number of other electronic devices or combinations thereof.

The resource server 110 may, for example, comprise any type of network-accessible electronic device or system that includes storage, such as the depicted resource store 112. The resource server 110 may, according to one example embodiment, comprise a public server that may be accessible to anyone who connects to it over a network, such as the network 140. According to another example embodiment, the resource server may require user registration and/or may require use of an authorized user device 150, to access it. The resource server 110 may store any type of data, such as various types of content, drivers for the one or more peripheral devices 190, applications, and/or any other data.

The compliance server 130 may be any type of network-accessible electronic device or system that includes storage, such as the depicted compliance rule store 132, and may be configured to communicate with the user device(s) 150 and/or the peripheral device(s) over one or more networks, such as the network 140 depicted in FIG. 1, to provide device management capabilities. For example, the compliance server 130 may comprise cloud-based solutions, server computers and/or any other system providing device management capability. For purposes of convenience, the compliance server 130 is referred to herein in the singular, although it is understood that a plurality of servers may be employed in the arrangements as descried herein. Furthermore, in some embodiments, multiple compliance servers 130 may operate on the same server computer. The components executed on the compliance server 130, for example, may comprise various applications, services, processes, systems, engines, or functionality not disclosed in detail herein.

The compliance server 130 may comprise a management application 132 and a compliance rule store 134 storing one or more compliance rules, e.g., compliance policies, that may be applicable to the user device(s) 150 and/or the peripheral device(s) 190. While the management application 132 is shown as within the compliance server 130, the management application 132 may additionally or alternately be within the user device(s) 150, the peripheral device(s) 190, and/or remotely located on the resource server 110 and may be remotely updated, such as periodically, via compliance server 130 according to any number of suitable over-the-air (OTA) updating methods.

Attempts by the user device(s) 150 to perform certain functionality, such as accessing a peripheral device 190 directly or via the network 140, may require the user device 150 to be in compliance with one or more of the compliance rules. Depending on the sensitivity of a given functionality, different compliance rules may be necessary to ensure that the functionality is adequately restricted. Some functionality may only require ensuring that the proper user is requesting the functionality. Other resources may require compliance with more stringent authorization rules, such as determining whether the functionality is restricted during certain time windows or geographic areas. Accordingly, the user device(s) 150 and/or the compliance server 130 may be operative to determine whether the user of user device 100 is authorized to perform requested functionality at the time the user requests to perform such functionality.

Compliance server 130 may, for example, use the compliance rules to impose hardware restrictions regarding the use of specific devices and/or specific device features, such as, for instance, cameras, Bluetooth, IRDA, tethering, external storage, a mobile access point, and/or other hardware restrictions. The compliance rules may additionally or alternatively impose software restrictions such as the use of specific wireless device operating systems or applications, internet browser restrictions, screen capture functionality, and/or other software restrictions. Mobile device management restrictions may additionally or alternatively be included in the compliance rules and may comprise encryption requirements, firmware versions, remote lock and wipe functionalities, logging and reporting features, GPS tracking, and/or other mobile device management features.

The compliance server 130 may determine whether the device characteristics of a requesting device (e.g. the user device(s) 150) satisfy one or more of the restrictions enumerated in the compliance rules. For example, the compliance server 130 may determine that a requesting device that has a camera, Bluetooth capability, and is executing a specified version of an operating system is compliant with the compliance rules. As another example, the compliance server 130 may determine that a requesting device that is associated with an external storage unit and has screen capture functionality enabled is not compliant with the compliance rules.

In some embodiments, an agent application 152 executed on the user device(s) 150 may make the compliance determination based on a device profile (e.g., the device profile 252 depicted in FIG. 2), credentials, and/or user preferences. For instance, the agent application 152 may monitor calls by applications, such as the web browser 154, email client 156, secure application 158, and/or any other application, on the user device(s) 150 to an operating system, e.g., the operating system depicted in FIG. 2, of the user device(s) 150 to determine whether user device(s) 150 seeks to perform functionality associated with one and/or more of the compliance rules described above, such as accessing the one or more peripheral device(s) 190. Additionally, the agent application 152 executed on the user device(s) 150 may approve and/or deny the associated functionality requests. For instance, the agent application 152 may instruct the operating system on user device(s) 150 to disable the camera of user device 150 in response to a determination that a compliance rule, e.g., one or more of the compliance rules 258 stored in the data store 252 depicted in FIG. 2, specifies that the camera cannot be used at the time of the request by the user device 150 to operate the camera.

In some embodiments, the agent application 152 executed on the user device(s) 150 may rely on the compliance server 130 to determine whether a given functionality request on the user device(s) 150, such as a request to access the peripheral device(s) 190, is permitted according to the compliance rules. For instance, the agent application 152 may transmit a functionality request, a device profile, credentials, and/or user data to the compliance server 130 so that compliance server 130 may determine whether user device 150 seeks to perform functionality that may violate a given compliance rule. Additionally, the compliance server 130 may approve and/or deny the associated functionality requests. For instance, the compliance server 130 may instruct the agent application 152 on the user device(s) 150 to instruct the operating system on the user device(s) 150 to activate a VPN security profile prior to opening a document and/or link.

In some embodiments, the compliance rules may comprise device settings and/or executable instructions that define which functionality the operating system of the user device(s) 150 is authorized to perform. Furthermore, the compliance rules may comprise a list of functions, such as those provided by AP is associated with the operating system and/or a platform library, such as the platform library 240 depicted in FIG. 2, that may be treated as protected functions. Calls to these functions, such as calls to retrieve login credentials, may result in checks by the user device 150, e.g., via the agent application 152, and/or the compliance server 130, e.g., via the management application, for compliance with the compliance rules.

In some embodiments, the agent application 152 may perform a set of ordered operations to accomplish a requested function. These operation sets may be defined on, e.g., stored in a memory of, the user device(s) 150 and/or the compliance server 130 and may comprise one or more operations to determine whether the user device 150 is in compliance with compliance rules from the compliance rule store 134. The agent application 152 may control at least one respective computing resource of the user device(s) 150. The operations may include configuring at least one respective computing resource of the user device(s) 150 such as restricting access to at least one resource managed by the agent application 152.

As shown in FIG. 1, the user device(s) 150, peripheral device(s), compliance server 130, and/or resource server 110 may communicate with one another directly and/or using the network 140. The user device(s) 150, peripheral device(s), compliance server 130, and/or resource server 110 may connect to the network 140 using wired or wireless means, such as using one or more intermediate networks. For example, the user device(s) 150, peripheral device(s), compliance server 130, and/or resource server 110 may connect with the network 140 using wired means such as Ethernet, USB (Universal Serial Bus), or the like, or using wireless means such as, for example, WI-FI, BLUETOOTH, or the like, or by connecting with a wireless cellular network, such as a Long Term Evolution (LT E) network, an L TE-Advanced (L TE-A) network, a Global Systems for Mobile communications (GSM) network, a Code Division Multiple Access (COMA) network, e.g., a Wideband COMA (WCDMA) network, a CDMA2000 network or the like, a General Packet Radio Service (GPRS)work or other type of network.

Accordingly, the Network 140 may comprise, for example, one or more wired and/or wireless networks such as one or more wireless local area networks (WLAN), wireless wide area networks (WWAN), Ethernet networks, fiber-optic networks, and/or any other type of wired and/or wireless network now known or later developed. Additionally, the Network 140 may comprise the Internet and/or one or more intranets, extranets, microwave networks, satellite communications networks, cellular networks, infrared communication networks, global area networks, or other suitable networks, etc., or any combination of such networks.

Figure 2:
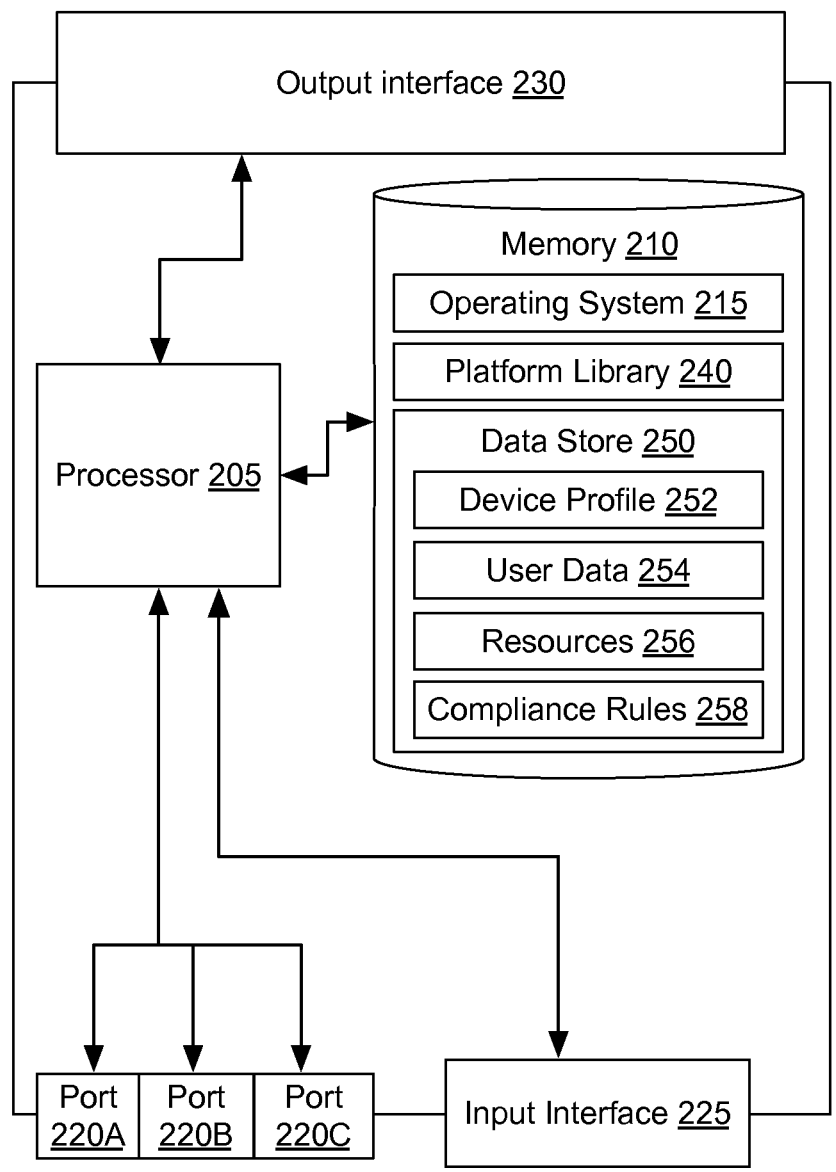
FIG. 2 is a schematic representation of an example user device which may be configured according to example embodiments of the present invention.

Turning now to FIG. 2, a diagram of an example user device 150 is depicted. While FIG. 2 illustrates one example configuration of such a user device 150, numerous other configurations may be used according to example embodiments of the present invention. With reference to FIG. 2, however, the user device may comprise a processor 205, e.g., at least one processor, co-processor, and/or processing circuitry, and at least one memory 210. Depending on the configuration and type of device, the memory 210 may comprise, but is not limited to, volatile (e.g. random access memory (RAM)), non-volatile (e.g. read-only memory (ROM)), flash memory, or any combination. The memory 210 may store executable programs, e.g., program code instructions, and related data components of various applications and modules for execution by the processor 205. The at least one memory 210 may be communicatively connected to the at least one processor 205, e.g., via one or more system busses for transferring data therebetween.

Basic functionality of the user device 150 may be provided by an operating system 215 contained in the at least one memory 210 and executed via the at least one processor 205. One or more programmed software applications may be executed by utilizing the computing resources in user device 150. For example, applications stored in the memory 210 may be executed by the processor 205 under the auspices of operating system 215. For example, processor 205 may be configured to execute applications such as web browsing applications, email applications, instant messaging applications, and/or other applications capable of receiving and/or providing data.

Data provided as input to and/or generated as output from the application(s) may be stored in the memory 210 and read by the processor 205 from the memory 210 as needed during the course of application program execution. Input data may be data stored in the memory 210 by a secondary application or other source, either internal or external to user device 150, or provided during installation of the application.

The user device 150 may include one or more communication ports, such as the three communication ports 220 (A)-(C) depicted in FIG. 2. Such communication ports 120(A)-(C) may allow user device 100 to communicate with other devices, and may comprise components such as an Ethernet network adapter, a modem, and/or a wireless network connectivity interface. For example, the wireless network connectivity interface may comprise one and/or more of a PCI (Peripheral Component Interconnect) card, USB (Universal Serial Bus) interface, PCMCIA (Personal Computer Memory Card International Association) card, SOIO (Secure Digital Input-Output) card, NewGard, Card bus, a modem, a wireless radio transceiver, and/or the like.

User device 150 may also receive data as user input via an input interface 225, such as a keyboard, a mouse, a pen, a stylus, a sound input device, a touch input device, a capture device, etc. The input interface may additionally or alternatively comprise one or more sensing devices, such as one or more cameras, microphones, motion detectors, proximity sensors, or the like, which may be configured to capture visual, aural, physical, and/or other types of stimuli, such as spoken words, motions and/or gestures, or the like.

Data generated by applications may be caused to be stored in the memory 210 by the processor 205 during the course of application program execution. Data may be provided to the user during application program execution by means of an output interface 230. The output interface may comprise one or more devices configured to provide information and/or stimuli to a user, such as one or more display devices; speakers; force, vibration, and/or haptic feedback generating devices; implanted and/or physiologically-integrated output devices; and/or the like. It will be understood that although the input and output interfaces 225, 230 are depicted as distinct components in FIG. 2, they may, according to example embodiments, be integrated into a single component comprising both input and output functionality. For example, the input and output interface 225, 230 may comprise a touchscreen device, e.g., a display device configured to both display information and receive user input, such as via a touch detection interface.

The at least one memory 210 may also comprise a platform library 240. The platform library 240 may comprise one or more collections of functionality, e.g., utilities, useful to multiple applications, such as may be provided by an application programming interface (API) to a software development kit (SDK). These utilities may be accessed by applications as necessary so that each application does not have to contain these utilities, thus allowing for memory consumption savings and a consistent user interface.

Furthermore, embodiments of this disclosure may be practiced in conjunction with a graphics library, other operating systems, or any other application program and is not limited to any particular application or system. The devices described with respect to the Figures may have additional features or functionality. For example, user device 100 may also include additional data storage devices (removable and/or non-removable) such as, for example, magnetic disks, optical disks, or tape (not shown).

The user device 150 may store in the memory 210, e.g., in a data store 250, a device profile 252 and user data 254. The device profile 252 may, for example, comprise information such as an indication of the current position of user device 150 and/or indications of various hardware, software, and/or security attributes pertaining to the user device 150. For instance, the device profile 252 may represent hardware specifications of the user device 150, version and/or configuration information of various software program and/or hardware components installed on user device 150, data transmission protocols enabled on user device 150, version and usage information of various resources stored on user device 150, and/or any other attributes associated with the state of user device 100. The device profile 252 may additionally or alternatively comprise data indicating a date of last virus scan of the user device 150, a date of last access of the user device 150 by an IT representative, a date of last service of the user device 150 by an IT representative, and/or any other data indicating maintenance and/or usage of the user device 150. The device profile 252 may additionally or alternatively comprise indications of past behavior of associated users, such as resources accessed, charges for resource accesses, and/or inventory accessed from such resources.

The user data 254 may comprise information regarding one or more users of the user device 150. For example, the user data 254 may comprise one or more user preferences, e.g., one or more parameters that may affect the experience of the user. Additionally or alternatively, the user data 254 may include indications a device user's age, gender, bodily traits, preferred resource types, preferred venue resources, and/or any other type of information relating to a user or combinations of such information.

The user device 150 may also store at least one resource 256 in the data store 250. The resources 256 may, for example, include any data, such as databases, applications, text files, word processor files, spreadsheet files, presentation files, graphic files, audio files, photographic files, video files, applications and/or application files, and/or the like. More specifically, resources 256 may include at least one of the following file types: data files, audio files, video files, three-dimensional image files, raster image files, vector image files, page layout files, spreadsheet files, database files, executable files, CAD files, web files, plug-in files, font files, system files, settings files, encoded files, compressed files, disk image files, developer files, backup files, and/or any other files.

Example embodiments of the invention will now be described with reference to FIG. 3, in which certain elements of an apparatus 300 for implementing various functionality of the present invention are depicted. In order to implement such functionality, the apparatus 300 of FIG. 3 may be employed, for example, in conjunction with one or more of the user device(s) 150, peripheral device(s), compliance server 130, and/or resource server 110 depicted in FIG. 1. However, it should be noted that the apparatus 300 of FIG. 3 may also be employed in connection with a variety of other devices, both mobile and fixed, in order to implement the various functionality of the present invention and therefore, embodiments of the present invention should not be limited to those depicted. It should also be noted that while FIG. 3 illustrates one example of a configuration of an apparatus 300 for implementing the functionality of the present invention, numerous other configurations may also be used to implement embodiments of the present invention.

Accordingly, it will be understood that various devices, components, and/or elements depicted and/or described as being in communication with each other may, for example, be embodied within a single device or distributed across multiple devices.

Figure 3:
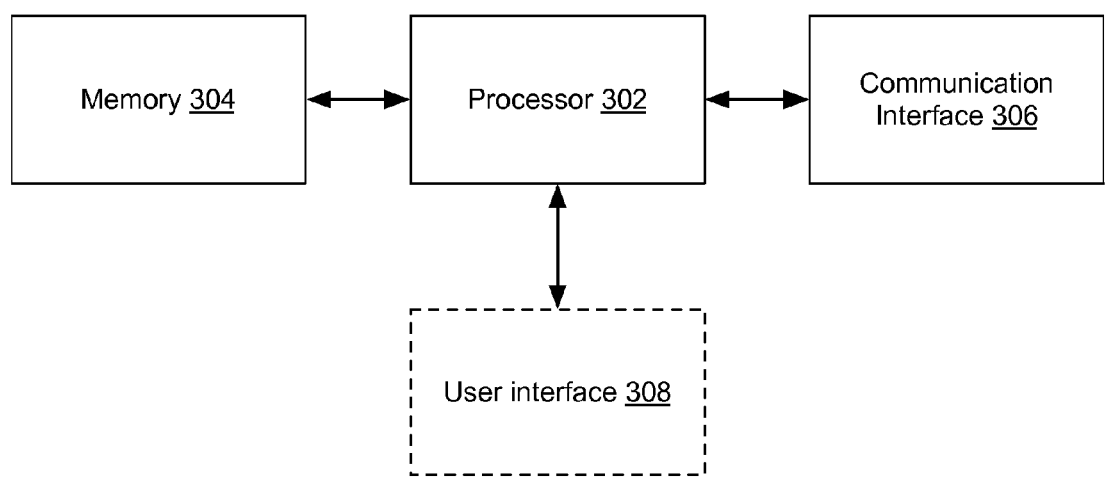
FIG. 3 is a schematic representation of an example apparatus that may be embodied by or otherwise associated with one or more electronic devices and which may be configured to implement example embodiments of the present invention.

Referring now to FIG. 3, the apparatus 300 for implementing the various functionality of the present invention may include or otherwise be in communication with a processor 302, a communication interface 306, and a memory device 304. As described below and as indicated by the dashed lines in FIG. 3, the apparatus 200 may also include a user interface 308, such as when the apparatus 300 is embodied by or otherwise associated with the user device 150 or the peripheral device 190. In some embodiments, the processor 302 (and/or co-processors or other processing circuitry assisting or otherwise associated with the processor 302) may be in communication with the memory device 304 via a bus configured to pass information among components of the apparatus 300. The memory device 304 may, for example, include one or more volatile and/or non-volatile memories. The memory device 304 may be configured to store information, data, content, applications, instructions, or the like, for enabling the apparatus 300 to carry out various functions in accordance with an example embodiment of the present invention. For example, the memory device 304 may be configured to store instructions, such as program code instructions, that, when executed by the processor 302, cause the apparatus 300 to carry out various operations.

The processor 302 may be embodied in a number of different ways. For example, the processor 302 may be embodied as one or more of a variety of hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 302 may include one or more processing cores configured to perform independently. A multi-core processor may enable multiprocessing within a single physical package. Additionally or alternatively, the processor 302 may include one or more processors configured in tandem via the bus to enable independent execution of instructions, pipelining and/or multithreading.

In an example embodiment, the processor 302 may be configured to execute instructions stored in the memory device 304 or otherwise accessible to the processor 302. Alternatively or additionally, the processor 302 may be configured to execute hard coded functionality. As such, whether configured by hardware or software methods, or by a combination thereof, the processor 302 may represent an entity (e.g., physically embodied in circuitry) capable of performing operations according to an embodiment of the present invention while configured accordingly. Thus, for example, when the processor 302 is embodied as an ASIC, FPGA or the like, the processor 302 may be specifically configured hardware for conducting the operations described herein. Alternatively, as another example, when the processor 302 is embodied as an executor of software instructions, the instructions may specifically configure the processor 302 to perform the algorithms and/or operations described herein when the instructions are executed. However, in some cases, the processor 302 may be a processor of a specific device (e.g., the user device 150, peripheral device 190, compliance server 130, and/or resource server 110) configured to employ an embodiment of the present invention by further configuration of the processor 302 by instructions for performing the algorithms and/or operations described herein. The processor 302 may include, among other things, a clock, an arithmetic logic unit (ALU) and logic gates configured to support operation of the processor 302.

Meanwhile, the communication interface 306 may be any means such as a device or circuitry embodied in either hardware or a combination of hardware and software that is configured to receive and/or transmit data from/to a network, such as the network 140, and/or any other device or module in communication with the apparatus 300. In this regard, the communication interface 306 may include, for example, an antenna (or multiple antennas) and supporting hardware and/or software for enabling communications with a wireless communication network. Additionally or alternatively, the communication interface 306 may include the circuitry for interacting with the antenna(s) to cause transmission of signals via the antenna(s) or to handle receipt of signals received via the antenna(s). In some environments, the communication interface 306 may alternatively or also support wired communication. As such, for example, the communication interface 306 may include a communication modem and/or other hardware/software for supporting communication via cable, digital subscriber line (DSL), universal serial bus (USB) or other mechanisms.

In some embodiments, such as instances in which the apparatus 300 is embodied by or otherwise associated with the user device 150 or the peripheral device 190, the apparatus 300 may include a user interface 308 in communication with the processor 302 to receive indications of user input and/or to cause audible, visual, mechanical or other output to be provided to the user. As such, the user interface 308 may, for example, include a keyboard, a mouse, a joystick, a display, a touch screen, touch areas, soft keys, a microphone, a speaker, or other input/output mechanisms. The processor 302 may be configured to control one or more functions of one or more user interface elements through computer program instructions (e.g., software and/or firmware) stored on a memory accessible to the processor 302 (e.g., memory device 304). In other embodiments, however, such as in instances in which the apparatus 300 is embodied by the compliance and/or resource server 130, 10, the apparatus 300 may not include a user interface 308.

It will be further understood that in embodiments in which the apparatus 300 is embodied by or otherwise associated with the user device 150, the memory device 304 may, for example, be embodied by the memory 210 depicted in FIG. 2; the processor 302 may, for example, be embodied by the processor 205 depicted in FIG. 2; the user interface 308 may, for example, be embodied by the input and/or output interfaces 225, 230 depicted in FIG. 2; and the communication interface 306 may, for example, be embodied by one or more of the communications ports 220A-C depicted in FIG. 2.

Figure 4:
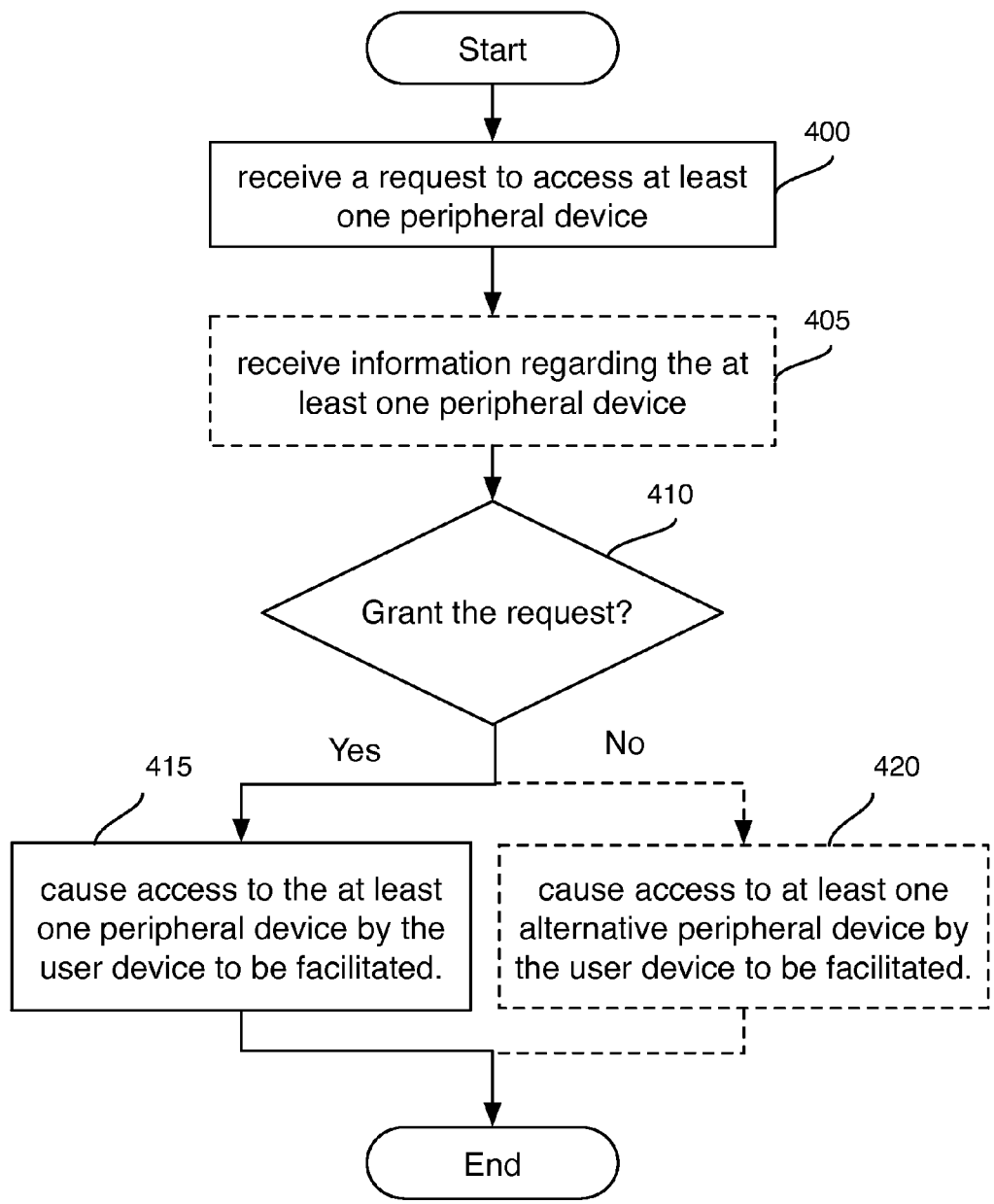
FIG. 4 is a flow chart illustrating operations that may be performed in accordance with an example embodiment of the present invention.
Figure 5:
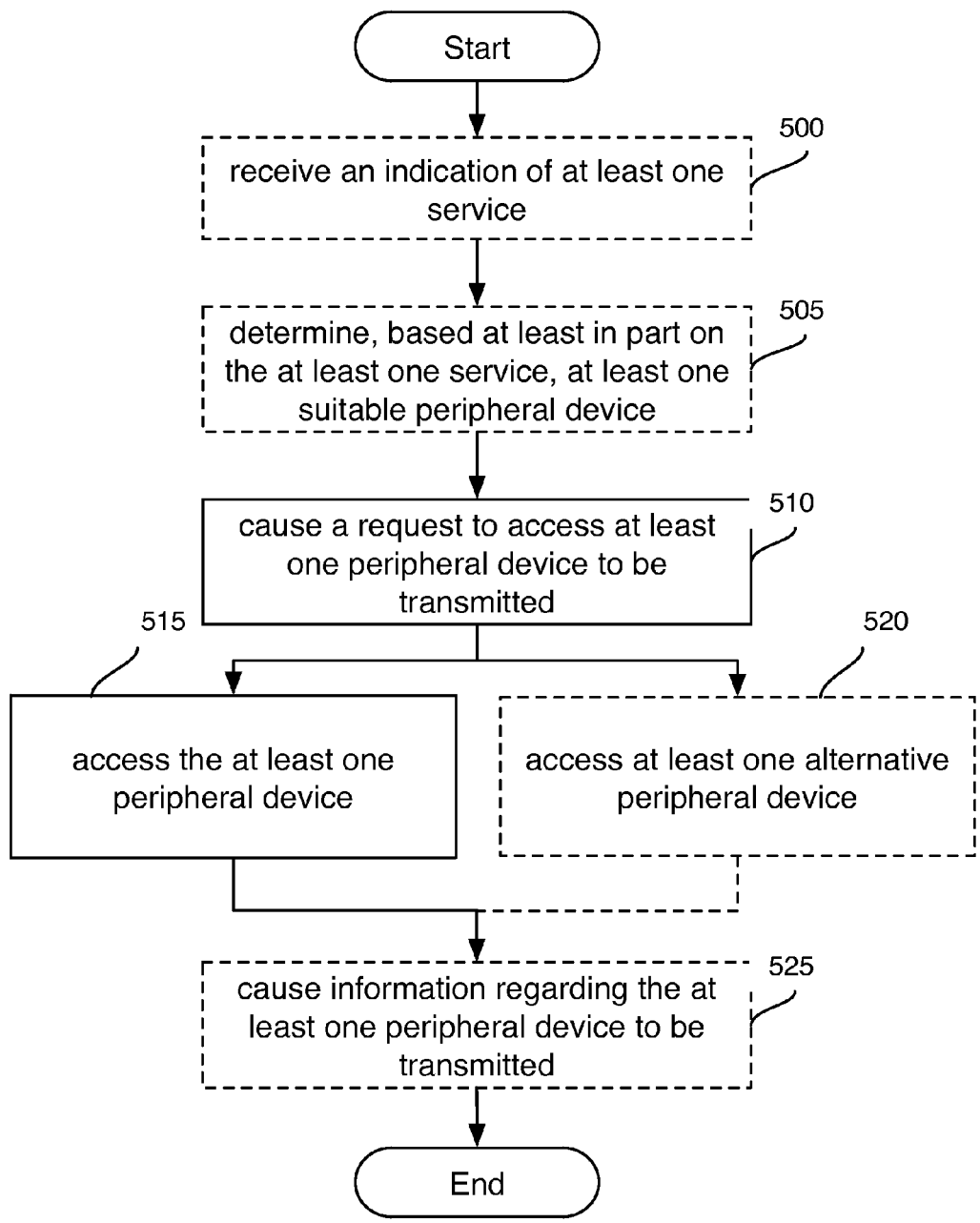
FIG. 5 is a flow chart illustrating operations that may be performed in accordance with an example embodiment of the present invention.

Referring now to FIGS. 4 and 5, various operations of an example embodiment of the present invention are depicted. As discussed below, the operations of FIGS. 4 and/or 5 may be performed by one or more apparatuses, such as the apparatus 300 depicted in FIG. 3, embodied by or otherwise associated with one or more of the user device(s) 150, peripheral device(s), compliance server 130, and/or resource server 110 depicted in FIG. 1.

In this regard, and turning first to FIG. 4, the apparatus 300 embodied by or otherwise associated with the peripheral device 190 and/or the compliance server 130 may include means, such as the processor 302, the memory 304, the communication interface 306, and/or the like, for receiving at least one request to access at least one peripheral device 190. See operation 400. Such at least one request may, for example, be received from one or more of the user devices 150. According to another example embodiment, the request may additionally or alternatively be received from the at least one peripheral device 190. That is, the peripheral device may, for example, receive a request from the user device and may, in response, route this request or transmit a new corresponding request to the compliance server 130.

Regardless of its origin and/or destination, the request may, according to an example embodiment, include information regarding the device requesting to access the at least on peripheral device 190, e.g., information regarding the one or more user device 150 from which the request was received. For example, the information may comprise at least a portion of the device profile 252 and/or the user data 254 discussed above in the context of the user device depicted in FIG. 2. According to another example embodiment, the information may additionally or alternatively include authentication information, such as user and/or device credentials, a security key, access credentials, username, password, and/or the like.

According to another example embodiment, the request to access the at least one peripheral device 190 by the user device 150 may additionally or alternatively include information regarding one or more services to be provided by the at least one peripheral device 190. For example, a request to access a printer may include information about a print job, such as whether the print job is in color and/or how many pages it includes. A request to access a vehicle may include information regarding load weight and/or a distance to be traveled. According to yet another example embodiment, the request to access the at least one peripheral device 190 by the user device 150 may comprise a generalized request. That is, the request may, for example, not request any particular peripheral device, but instead comprise a general request, such as a request for a particular type of peripheral device (e.g., printer, vehicle, etc.). The determination of whether to grant such a generalized request may therefore comprise, as will be discussed in greater detail below, a determination of what peripheral device 190 is to serve the request if it is granted.

According to an example embodiment, the apparatus 300 embodied by or otherwise associated with the compliance server 130 and/or the at least one peripheral device 190 may further comprise means, such as those discussed above, for receiving information regarding the at least one peripheral device. See operation 405. The information regarding the at least one peripheral device may, for example, comprise status information. Such status information may, for example, comprise information regarding one or more statuses of the at least one peripheral device 190, such as whether the at least one peripheral device is currently being accessed, e.g., used; an access request queue length; information regarding one or more resources of the at least one peripheral device; information regarding errors or failures of the at least one peripheral device; or the like.

In the interest of providing further clarity on the foregoing, examples of operational status information may include information such as a gas level, mileage, tire pressure, error notifications or the like for a vehicle peripheral device; ink or toner levels for a printer peripheral device; or available storage space for a cloud storage system peripheral device. Other examples of operational status information regarding these and other types of peripheral devices may come to the minds of those of ordinary skill in the art. Accordingly, the scope of the present invention is not limited in any way by the examples provided above.

According to an example embodiment, the information regarding the at least one peripheral device 190 may additionally or alternatively comprise usage information, such as information regarding current and/or past usage, one or more frequencies of usage, information regarding one or more origins of access requests, or the like. According to another example embodiment, the apparatus 300 embodied by or otherwise associated with the peripheral device 190 and/or the compliance server 130 may additionally or alternatively comprise means, such as those discussed above, for determining and/or generating such usage information based on received information regarding the at least one peripheral device 190, such as based on status information or the like.

According to another example embodiment, the information regarding the at least one peripheral device 190 may additionally or alternatively comprise information gathered via at least one sensing device communicatively associated with the at least one peripheral device. The information may, for example, comprise information gathered via one or more cameras, microphones, motion sensors, or the like. For example, in an instance in which the at least one peripheral device 190 comprises a vehicle, the information might comprise video received via a dashboard camera, accelerometer, breathalyzer, or any number of other sensing devices that may be associated with the vehicle.

According to a further embodiment, the apparatus 300 embodied by or otherwise associated with the compliance server 130 and/or peripheral device 190 may include means, such as those discussed above, for determining at least one peripheral device optimization scheme based at least in part on the information regarding the at least one peripheral device 190, e.g., such as the usage information. The at least one optimization scheme may, for example, comprise one or more optimization suggestions, such as one or more procurement suggestion, e.g., one or more suggestions to purchase and/or add one or more additional peripheral devices, such as one or more peripheral devices of a specific type or that are configured to provide one or more particular services; one or more location suggestions, e.g., one or more suggestions regarding where to locate one or more peripheral devices; and/or one or more disposal suggestions, e.g., one or more suggestions to remove and/or dispose of one or more peripheral devices, such as peripheral devices determined to be unnecessary or redundant based on the usage information.

The apparatus 300 embodied by or otherwise associated with the peripheral device 190 and/or the compliance server 130 may further include means, such as the processor 302, the memory 304, the communication interface 306, and/or the like, for determining whether to grant the request to access the at least one peripheral device. See operation 410. The apparatus 300 may, for example, make this determination based at least in part on the information regarding the user device 150 requesting the access and at least one compliance rule. Thus, for example, a compliance rule may provided that only members of one or more particular policy groups are permitted to access one or more particular peripheral devices. The request to access at least one of the particular peripheral devices may thus comprise information regarding the requesting user device, such as a device or user 10, such that a policy group for the user device 150 may be determined and, based on this policy group and the compliance rule defining allowed policy groups, a determination may be made as to whether the requested access to the at least one particular peripheral device by the requesting user device should be granted.

According to another example embodiment, the at least one compliance rule may comprise at least one geographic condition. That is, the at least one compliance rule may, for example, provide that access to one or more particular peripheral devices 190 is limited to user devices 150 whose current locations are within a given geographic area or within a given proximity to the particular peripheral devices 190. According to another example embodiment, the at least one compliance rule may, for example, comprise at least one temporal condition such that, for example, the at least one compliance rule provides that access to one or more particular peripheral devices 190 is limited to one or more particular periods of time or that such access, once initially granted, is limited to a particular duration.

Further examples of compliance rules may include rules directed to user device 150 hardware and/or software configurations, so as to, for example, ensure only user devices 150 that are compatible with a particular peripheral device 190 are granted access thereto. Compliance rules may additionally or alternatively comprise rules directed to limiting access to peripheral devices 190 by user devices 150 that are not in compliance with various security, configuration, and/or usage policies. As but one example, the at least one compliance rule may provide that compromised, e.g., "jailbroken" or "rooted," devices are denied access to one or more peripheral devices. An unlimited number of other configuration rules may additionally or alternatively be provided according to other example embodiments, the scope of the present invention not being limited by the examples being explicitly provided herein.

The determination of whether to grant the request may additionally or alternatively be based at least in part on the information regarding the at least one peripheral device that may be received as discussed above. For example, the apparatus 300 embodied by or otherwise associated with the compliance server 130 and/or the at least one peripheral device 190 may include means, such as those discussed above, for determining, based at least in part on received status or usage information, whether the at least one peripheral device 190 would be capable of serving the at least one user device 150. As discussed above, the request to access the at least one peripheral device 190 by the user device 150 may include information regarding a nature of one or more desired services. Accordingly, the determination of whether the at least one peripheral device 190 would be capable of serving the at least one user device may be further based on this information. For example, a request to access a printer for the purpose of serving a 150 page printing request may be denied if, for example, the operational status information regarding the printer indicates there is only enough ink for 50 pages. Similarly, a request to access a vehicle for the purpose of making a delivery 1000 miles away may be denied if, for example, the operational status information regarding the vehicle indicates an oil change or another type of service is due in 25 miles.

As discussed above, the request to access the at least one peripheral device 190 may, according to some example embodiments, comprise a generalized request. For example, such a generalized request may comprise a request to access a particular class or type of peripheral device, as opposed to one or more particular peripheral devices. Accordingly, determining whether to grant the request may, according to an example embodiment, additionally or alternatively comprise determining, based at least in part on the generalized request, one or more particular peripheral devices for handling the generalized request. Such a determination may, for example, be based at least in part on any of the received information regarding the requesting user device 150, as discussed above, such as a location of the user device 150. For example, a peripheral device may be determined based at least in part on how close in proximity it is to the requesting user device 150. The determination may additionally or alternatively, for example, be based at least in part on the at least one compliance rule. That is, a particular peripheral device may be determined based at least in part on whether access to the particular peripheral device by the user device 150 would be allowed according to the at least one compliance rule.

According to another example embodiment, the apparatus 300 embodied by or otherwise associated with the peripheral device 190 and/or the compliance server 130 may further include means, such as the processor 302, the memory 304, the communication interface 306, and/or the like, for causing access to the at least one peripheral device 190 by the user device 150 to be facilitated in an instance in which it is determined to grant the request to access the at least one peripheral device. See operation 415. Causing access to the at least one peripheral device 190 may, for example, comprise causing software, such as one or more device drivers or the like, corresponding to the at least one peripheral device 190 to be installed on the user device 150. According to another example embodiment, causing access to the at least one peripheral device 190 may, for example, comprise causing the at least one peripheral device 190 to permit access by the user device 150 or causing a connection to be established between the at least one peripheral device 190 and the user device 150. Causing access to the at least one peripheral device 190 may, in some embodiments, be facilitated by processing, logging, and/or negotiating access charge payments associated with the at least one peripheral device 190. Causing access to the at least one peripheral device 190 may, in some embodiments, be facilitated by relaying functional commands between the at least one peripheral device 190 and the user device 150, such as through the compliance server 130.

According to another example embodiment, the apparatus 300 embodied by or otherwise associated with the peripheral device 190 and/or the compliance server 130 may further include means, such as the processor 302, the memory 304, the communication interface 306, and/or the like, for causing access to at least one alternative peripheral device by the user device to be facilitated in an instance in which it is determined not to grant the request to access the at least one peripheral device. See operation 420. For example, the apparatus 300 may cause access to at least one alternative peripheral device to be facilitated in an instance in which it is determined that a compliance rule prevents the user device 150 from accessing the requested peripheral device 190. According to another example, the apparatus 300 may cause access to at least on alternative peripheral device to be facilitated in an instance in which it is determined, e.g., based at least in part on operational status information, not to grant the request. For example, such alternate access may be facilitated in an instance in which the operational status information indicates that the at least one peripheral device to which the user device 150 requested access is malfunctioning, low on resources, in use, being serviced, etc.

Having thus described various functionality that may be provided in association with a compliance server 130 and/or at least one peripheral device 190, attention will be turned to FIG. 5 to discuss corresponding functionality that may be provided in association with a user device 150. In this regard, an apparatus, such as the apparatus 300 depicted in FIG. 3, may be embodied by or otherwise associated with the user device 150 and may comprise means for carrying out the operations depicted in FIG. 5.

For instance, the apparatus 300 embodied by or otherwise associated with the user device 150 may include means, such as the at least one processor 302, the at least one memory 304, the communication interface 306, the user interface 308, and/or the like for receiving an indication of at least one service, e.g., at least one service that may be provided by one or more peripheral devices, such as the at least one peripheral device 190 depicted in FIG. 1. See operation 500. Receiving the indication may, for example, comprise receiving selection of one or more services, such as by a user. For example, a user may select, such as via a user interface 308 of the user device 150, an option to print a document, backup a file, access a vehicle or security door, or the like. As another example, receiving the indication of at least one service may comprise receiving an indication from a peripheral device configured to provide the at least one service. For example, the apparatus 300 may receive a signal indicating one or more available services from one or more peripheral device 190, upon moving in proximity to, e.g., in communication range of, the one or more peripheral devices 190.

According to another example embodiment, the apparatus 300 embodied by or otherwise associated with the user device 150 may include means, such as the at least one processor 302, the at least one memory 304, the communication interface 306, and/or the like for determining at least one suitable peripheral device, e.g., at least one peripheral device configured to provide the at least one service. See operation 505. The determination may, for example, be made based at least in part on at least one indicated service. For example, the apparatus 300 may consult a file, database, or the like, including one or more associations, e.g., mappings, between one or more services and one or more suitable peripheral devices. According to another example embodiment, the at least one peripheral device may be selected, e.g., by a user via the user interface 308. The determination of the at least one suitable peripheral device may additionally or alternatively be based at least in part on information regarding the desired service. The information regarding the desired service may, for example, comprise more factors and/or parameters relating to the desired service, such as one or more user preferences regarding the service, one or more requirements for optimal provision of the service, or the like.

According to another example embodiment, the apparatus 300 embodied by or otherwise associated with the user device 150 may include means, such as those discussed above, for causing the above-described request to access at least one peripheral device 190 to be generated and/or transmitted. See operation 510. The features and/or contents of the request may be in accordance with the description provided above. The apparatus 300 embodied by or otherwise associated with the user device 150 may cause the request to be generated and/or transmitted automatically, such as in response to receiving an indication that the user device is in proximity to the at least one peripheral device to which the request pertains. For example, a user may approach at least one peripheral device for which physical proximity thereto may have a tendency to indicate a desire or need to access the at least one peripheral device and the user's user device 150 may automatically generate an appropriate corresponding request to access the peripheral device. Non-limiting examples of peripheral devices for which this behavior may be beneficial, that is, peripheral devices for which physical proximity may be indicative of a desire or need for access thereto, may include vehicles; security systems; home and/or office automation systems; scanners, fax machines, copiers or the like; or any other such peripheral devices where accessing a provided service of the peripheral device may either require or be facilitated by user proximity and/or direct user interaction.

According to another example embodiment, the apparatus 300 embodied by or otherwise associated with the user device 150 may cause the request to be generated and/or transmitted in response to receiving user input, such as user input indicating a service, e.g., a need or desire for a service, provided by the at least one peripheral device 190, as discussed above. As discussed above, the apparatus 300 may, for example, include means, such as the at least one processor 302, the at least one memory 304, the communication interface 306, and/or the like for determining, based at least in part on the indicated service, a peripheral device configured to provide the service and to generate and/or transmit a request for access to the determined peripheral device. Thus, a user may, for example, indicate a need for a service, such as by indicating via the user interface 308 a need to "print" a document or the like, and the apparatus 300 may thereby determine at least one suitable peripheral 190 configured to provide the needed service, e.g., a printer in this example, and automatically generate and/or transmit a request for access to the at least one suitable peripheral device.

The determination of the at least one suitable peripheral device may additionally or alternatively be based at least in part on information regarding the at least one peripheral device. The information regarding the at least one peripheral device may, for example, comprise a proximity to the at least one peripheral device, operational status information regarding the at least one peripheral device (as will be discussed further below), at least one capability of the at least one peripheral device (such as, continuing with the printer example, whether the printer prints in black and white and/or color), authorization information (e.g., which, if any, of the one or more peripheral devices the user is authorized, or is likely to be authorized, to access), and/or usage information, such as whether the at least one peripheral device is currently being accessed, e.g., used, or a number of queued requests to access the peripheral device.

According to an example embodiment, the apparatus 300 embodied by or otherwise associated with the user device 150 may include means, such as those discussed above, for accessing at least one peripheral device 190. See operations 515 and 520. As discussed above, the at least one peripheral device accessed by the apparatus 300 embodied by or otherwise associated with the user device 150 may be the requested peripheral device, a peripheral device determined by the apparatus 300 embodied by or otherwise associated with the compliance server 130 or one or more peripheral devices 190 based on a generalized request, or an alternative peripheral device, such as in an instance in which a request is denied.

According to another example embodiment, the apparatus 300 embodied by or otherwise associated with the user device 150 may include means, such as those discussed above, for causing information regarding the at least one peripheral device 190 to be transmitted. See operations 525. The apparatus 300 embodied by or otherwise associated with the user device may, for example, gather various information regarding the at least one peripheral device, such as any or all of the information discussed above, and may cause this information to be transmitted, such as to the compliance server 130. This information may, for example, be gathered following accessing the peripheral device or, according to another example embodiment, may be gathered in an instance in which the apparatus embodied by or otherwise associated with the user device 150 is in communication range of the at least one peripheral device. Thus, for example, user devices 150 may gather information from various peripheral devices as their users carry them into proximity of the peripheral devices. In this way, inspections of peripheral devices 190 by support personnel may be supplemented or even rendered unnecessary, as user devices 150 may be used to automatically gather and transmit information regarding such peripherals 190.

As described above, FIGS. 4 and 5 illustrate flowcharts of example apparatuses 300, methods, and computer program products according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 304 of an apparatus 300 employing an embodiment of the present invention and executed by a processor 302 of the apparatus 300. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or enhanced. Furthermore, in some embodiments, additional optional operations may be included. Modifications, additions, or enhancements to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

All rights including copyrights in the code included herein are vested in and the property of the Assignee. The Assignee retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving, in a compliance server, a request for a user device to access a peripheral device, the request comprising information regarding the user device, information regarding the peripheral device, and an authentication credential associated with user data, wherein the request is sent in response to a detection of the user device in proximity to the peripheral device;
   determining, in the compliance server, by comparing at least one compliance rule to the information regarding the user device and the information regarding the peripheral device, whether to grant the request for the user device to access the peripheral device; and
   facilitating, by the compliance server, access to the peripheral device for the user device in response to determining that the request for the user device to access the peripheral device is granted.

2. The method of claim 1, wherein the request is sent on behalf of the user device by the peripheral device.

3. The method of claim 1, wherein the information comprises an operational status associated with the peripheral device, the operational status comprising usage information associated with a consumable resource of the peripheral device.

4. The method of claim 1, wherein facilitating access to the peripheral device for the user device further comprises initiating installation of software corresponding to the peripheral device on the user device.

5. The method of claim 1, wherein the at least one compliance rule comprises a requirement that the user device comply with at least one geographic condition.

6. The method of claim 1, wherein the at least one compliance rule comprises a requirement that a current time comply with at least one temporal condition.

7. The method of claim 1, further comprising:
   receiving, using the compliance server, information regarding the peripheral device; and
   determining, using the compliance server, whether to grant the request is further based at least in part on the information regarding the peripheral device.

8. The method of claim 7, further comprising initiating, using the compliance server, access to another peripheral device by the user device to be facilitated in response to a determination that access to the peripheral devices is not granted.

9. The method of claim 7, further comprising causing, using the compliance server, another request to be generated based at least in part on the information regarding the peripheral device, wherein the other request comprises at least one of: a maintenance request pertaining to the peripheral device or a support request pertaining to the peripheral device.

10. The method of claim 7, wherein the information regarding the peripheral device comprises information gathered via at least one sensing device communicatively coupled to the peripheral device.

11. The method of claim 1, further comprising:
    determining, using the compliance server, based at least in part on the information regarding the user device, whether the user device has been compromised; and
    denying, using the compliance server, the request to access the peripheral device in response to a determination that the user device has been compromised.

12. A computing device comprising at least one processor and at least one memory storing program code instructions, the at least one memory and program code instructions being configured to direct the computing device to at least:
    receive a request for a user device to access a peripheral device, the request comprising information regarding the user device and the peripheral device, and an authentication credential associated with user data, wherein the request is sent in response to a detection of the user device in proximity to the peripheral device;
    determine, by comparing at least one compliance rule to the information regarding the user device and the peripheral device, whether to grant the request to access the peripheral device; and
    enable access to the peripheral device for the user device in response to determining that the request for the user device to access the peripheral device is granted.

13. The computing device of claim 12, wherein the request is sent on behalf of the user device by the peripheral device.

14. The computing device of claim 12, wherein the at least one compliance rule comprises a requirement that the user device be complies with at least one geographic condition in order to access peripheral device.

15. The computing device of claim 12, wherein access to the peripheral device for the user device is enabled by initiating installation of software corresponding to the peripheral device on the user device.

16. The computing device of claim 12, wherein the request is automatically generated by the user device when the user device is in proximity to the peripheral device.

17. A non-transitory computer readable storage medium having program code portions embodied therein, the program code portions being configured to, upon execution, direct at least one processor to at least:
    receive, from a user device, a request to access a particular service, the request comprising information regarding the user device, information regarding a peripheral device, and an authentication credential associated with user data, wherein the request is automatically generated by the user device when the user device is within a proximity of the peripheral device;

determine, by comparing at least one compliance rule to the information regarding the user device and the information regarding the peripheral device, whether to grant the request to access the particular service;

identify, based at least in part upon a functionality required by the particular service, whether the peripheral device is associated with the particular service; and authorize the user device to access the at least one suitable peripheral device by the user device in response to the request being granted.

18. The non-transitory computer readable medium of claim 17, wherein the request further comprises a location of the user device.

19. The non-transitory computer readable medium of claim 17, wherein the program code is further configured to direct the at least one processor to:

receive the request to access the particular service from a peripheral device on behalf of the user device in response to a request obtained by the peripheral device from the user device to access the peripheral device;

determine whether the peripheral device comprises the at least one suitable peripheral device associated with the particular service requested via the user device;

designate the peripheral device as the at least one suitable peripheral device in response to determining that the peripheral device comprises the at least one suitable peripheral device; and initiate access to the peripheral device by the user device to be facilitated in response to designation of the peripheral device as the at least one suitable peripheral device.

20. The non-transitory computer readable medium of claim 17, wherein the request to access the particular service comprises a request to print a document.

* * * * *